United States Patent

[11] 3,548,798

| [72] | Inventors | Alfred R. Fleischer<br>Concord;<br>John J. Barich, San Mateo, Calif. |
|---|---|---|
| [21] | Appl. No. | 771,845 |
| [22] | Filed | Oct. 30, 1968 |
| [45] | Patented | Dec. 22, 1970 |
| [73] | Assignee | De Laval Turbine Inc.<br>a corporation |

[54] ENGINE CONTROLLER
2 Claims, 5 Drawing Figs.

[52] U.S. Cl.................................................. 123/140,
123/32, 123/41, 123/142.5, 123/179, 60/13
[51] Int. Cl........................................................ F02d 13/00
[50] Field of Search.......................................... 123/41,
139.13, 140, 142.5, 179-H; 60/13

[56] References Cited
UNITED STATES PATENTS

| 2,594,575 | 4/1952 | May et al. ..................... | 123/41X |
| 2,670,594 | 3/1954 | Crooks.......................... | 60/13 |
| 2,703,563 | 3/1955 | Hancock ...................... | 123/139.13 |
| 2,940,431 | 6/1960 | Kahr et al. ................... | 123/41 |
| 3,397,684 | 8/1968 | Scherenberg................. | 60/13X |

*Primary Examiner*—Laurence M. Goodridge
*Attorney*—Lothrop & West

ABSTRACT: An engine controller for a poppet valve, internal combustion engine having a shiftable valve camshaft and an inlet air throttle is equipped with governor responsive means for shifting the camshaft and the throttle into one position for low speed or low load operation and into a different position for high speed or high load operation, the valve timing and inlet air pressure being thereby varied. Additionally, inlet air temperature and fuel injection timing may be correspondingly varied.

3,548,798

INVENTORS
ALFRED R. FLEISCHER
BY JOHN J. BARICH

Lothrop & West
ATTORNEYS

ENGINE CONTROLLER

Heavy-duty, low to medium speed internal combustion engines controlled by poppet valves, such as turbocharged diesel engines, are usually designed for all of the operating parameters to be maximized at a heavy load or high speed condition. Sometimes the optimization is for both high speed and heavy load. In practice, however, it often occurs that such an engine must be idled at very low speed or at quite light load for a protracted time. The long-continued idling or light load operation has substantial, deleterious effects because there is a long overlap of exhaust and inlet events, air under pressure is admitted to the cylinder quite early before top dead center and the correspondingly timed fuel injection likewise occurs quite early. These timing relationships tend to produce poor gas flow conditions and substantial negative work. The engine operates roughly and quite noisily, both factors indicating extra wear and shock. In addition, the combustion is likely to be quite poor with residual fuel unburned or carbonized deposited in various parts of the cylinder or piston where it is highly disadvantageous. Fuel is even carried over into the exhaust manifold without having been burnt. Upon a subsequent sudden access of load substantial smoke and afterburning take place. It is also true that under idle or light load conditions the combustion air is likely to be much cooler than it is during heavy load or normal operation, so that the fuel does not burn evenly, well or completely. A train of troubles follows poor combustion.

It is therefore an object of our invention to provide an engine controller which can be operated so that the engine under its normal heavy load or high speed conditions is just as effective as ever but which can be shifted to another operating condition for low speeds or light loads and then will run well under appropriate idling or light load conditions, thus obviating the difficulties mentioned above.

It is therefore an object of the invention to provide an engine controller which will afford appropriate high speed, heavy load engine operation and also appropriate low speed, light load engine operation.

Another object of the invention is to provide an engine controller which will change the various engine conditions of operation in accordance with demands on the engine.

Another object of the invention is to provide means for automatically changing the engine operating mechanism in accordance with the momentary engine load or speed requirements.

A further object of the invention is to provide an engine controller that can readily be adapted to different environments for improving the overall operation of the engine.

A further object of the invention is in general to provide an improved engine controller.

Other objects of the invention together with the foregoing are attained in the embodiments of the invention described in the accompanying description and illustrated in the accompanying drawings, in which.

While the engine controller pursuant to the invention can be utilized in connection with various different engines in sundry different environments, such as engines for pumping or compressing or generating electricity or for marine propulsion and the like, it has successfully been incorporated in the forms shown herein.

Figure 1:
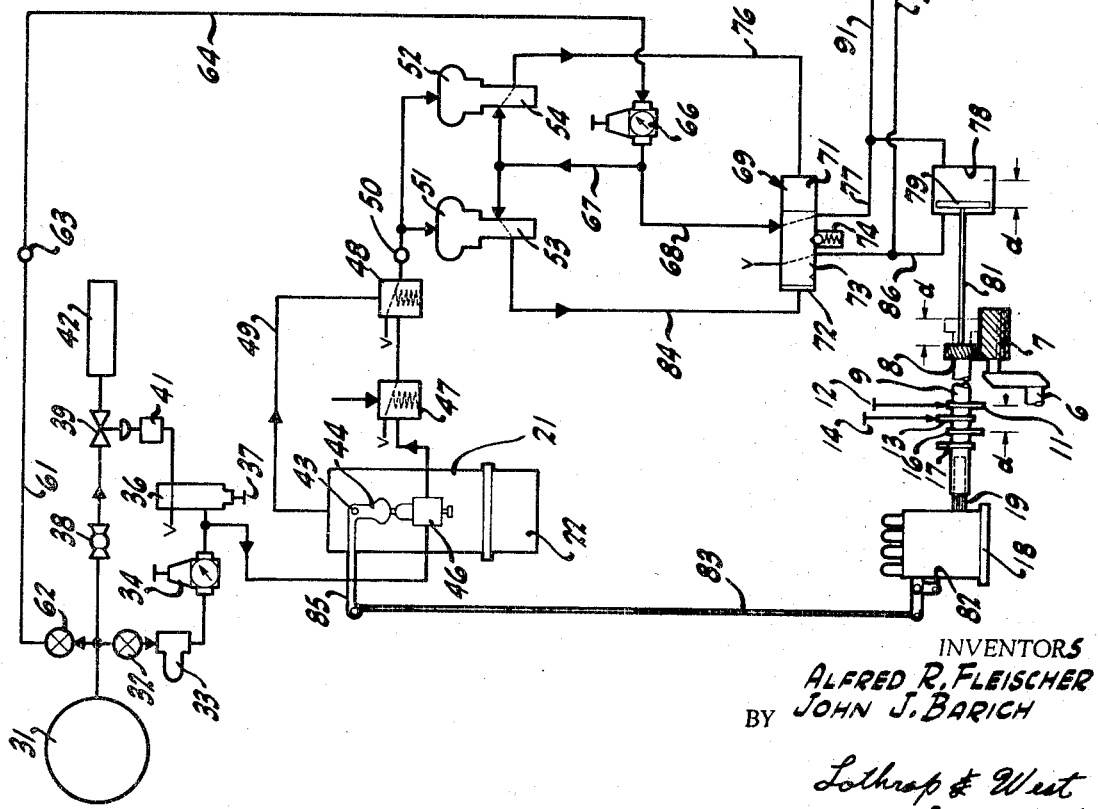
FIG. 1 is a diagram showing one form of engine controller pursuant to the invention, the controls being shown in stop position.
Figure 2:
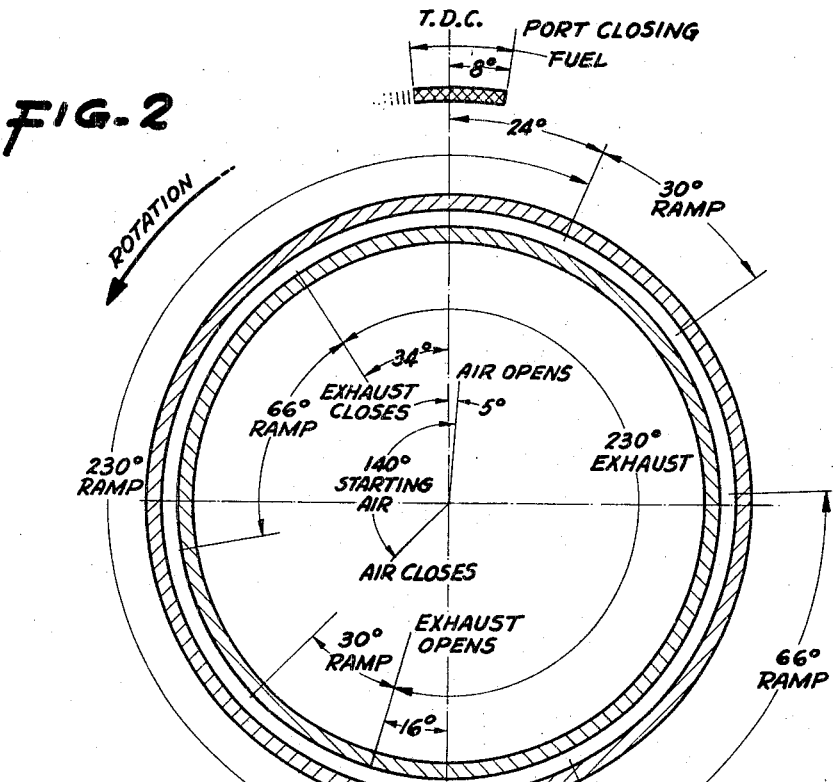
FIG. 2 is a timing diagram of the engine for low speed or low load operation.
Figure 3:
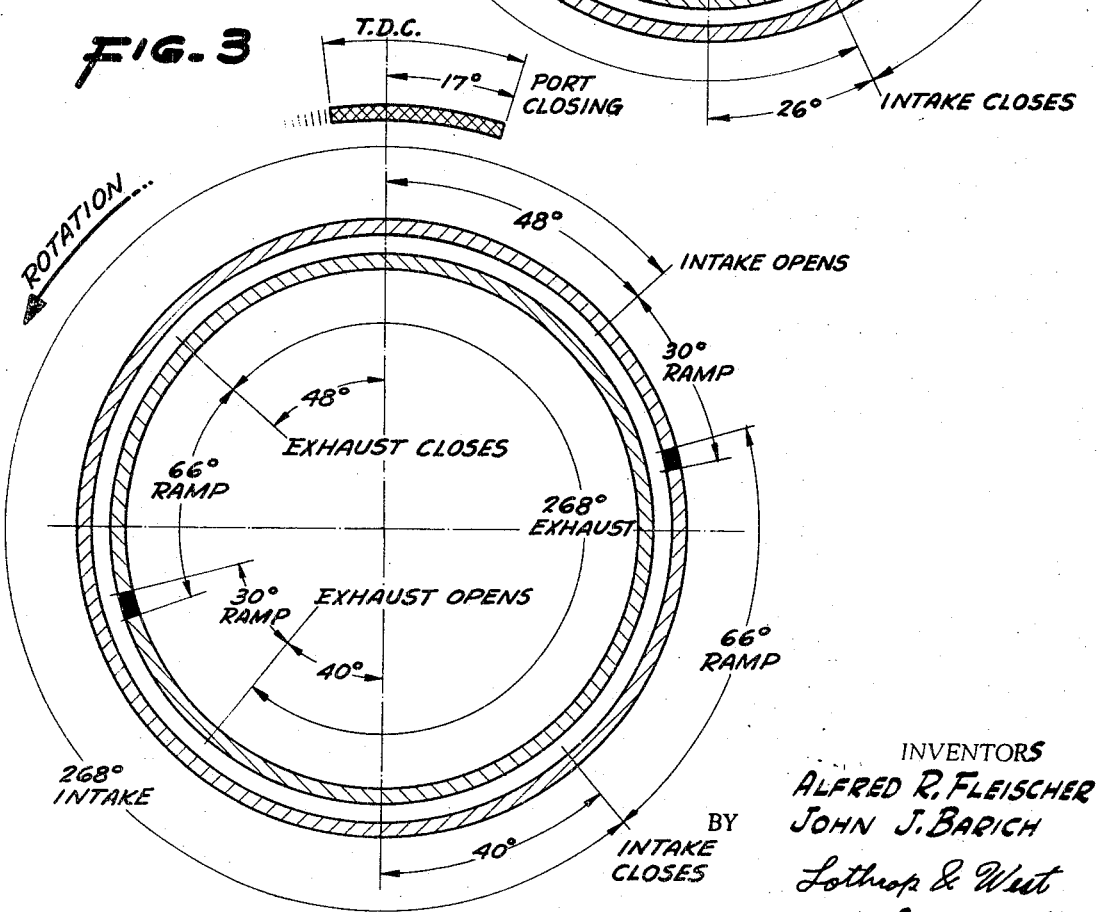
FIG. 3 is a timing diagram of the engine operation for high speed or high load functioning.

In the first form, as particularly illustrated in FIGS. 1—3 inclusive, the engine is represented only diagrammatically but is understood to be a reciprocating, internal combustion, poppet valve, injection engine. It has the customary crankcase, cylinders and appurtenant equipment including a crankshaft 6 provided with a drive gear 7 at one end thereof meshing with a driven gear 8 on the end of a camshaft 9. The camshaft is mounted not only to rotate around its own axis, but likewise to shift along its rotational axis. On the camshaft for each of the cylinders there is provided a low speed or low load cam 11 for one of the cylinder valves 12, and there is a companion low load or low speed cam 13 for the associated valve 14 of the same cylinder. Located on the camshaft adjacent the cams 11 and 13 are high speed cams 16 and 17. The cam 16 complements the cam 11, whereas the cam 17 complements the cam 13. The complementary cams have different contours to afford different timing of the events controlled by the valves 12 and 14.

A fuel pump 18 is provided to inject diesel oil, for example, into the cylinders of the engine. Although it is sometimes differently mounted and driven in practice, as an illustrative example herein we arrange that the fuel pump have a drive shaft 19 connected to rotate with the camshaft 9 but not to translate with the camshaft.

There is a governor 21 of the usual kind connected to the engine. The governor is driven either directly from the crankshaft 6 or by a comparably rotating member such as a local synchronous motor (not shown) connected to the crankshaft and driven by a synchronous generator 22, so that the governor follows exactly the condition of operation of the engine.

Combustion air for the engine is preferably provided from the atmosphere through an engine exhaust turbine driven centrifugal compressor (not shown) which delivers the air into an intake tube 23 at a pressure above atmospheric. The air in the tube 23 flows through a heat exchanger 24 into the intake manifold 26 of the engine.

We provide a control instrumentality effective upon the camshaft 9, the fuel pump 18, the air pressure in the tube 23, and also the temperature in the heat exchanger 24. In order to operate the necessary instrumentalities it is preferred to utilize compressed air as a motive force. This is derived from a tank 31 or other suitable source at a pressure of approximately 250 pounds per square inch. The compressed air is made available through a shutoff valve 32 and a strainer 33 to a pressure regulator 34 from which it issues at a lower pressure; for example, 75 pounds per square inch, and is then provided at that pressure to a pull valve 36 having a manual operating button 37. Air from the source 31 is likewise made available through a shutoff valve 38 to a starting valve 39.

In order to start the engine, the operator pulls the hand control button 37, thus passing low pressure air toward the starting valve 39. Interposed in the connecting line is an interlock 41 for preventing improper starting when the barring-over device is not in condition. When the engine is ready to be started, the interlock 41 is open so that the control air under low pressure opens the starting valve 39 and permits high pressure air to flow to the engine starting manifold 42. The engine then revolves and starts to run. However, during this time and before the engine rolls over very rapidly, the parts are either already in or are automatically moved into condition for low speed and low load operation.

The engine governor 21, being responsive to engine conditions, has an output shaft 43 which reflects the momentary condition of the engine. In addition to the usual governor mechanism, the output shaft carries a cam 44 of any desired configuration to actuate a pressure regulator 46 in accordance with engine conditions, such as speed or load or both. Low pressure air is brought from just ahead of the starting valve 36 to a pressure regulator 46 in which the pressure is reduced from approximately 75 pounds per square inch to a variable lower value, which depends on the governor position. The lower value ranges from 3 pounds per square inch to 15 pounds per square inch, so that downstream of the pressure regulator 46 the line air pressure varies directly in accordance with the engine condition.

Air pressure in the line downstream of the regulator 46 extends through a safety shutdown valve 47 which is normally vented and closed. If all of the controlling instrumentalities such as oil pressure, water temperature, fuel pressure and the like are appropriate, the valve 47 is open so that air flows through it to a pilot valve 48 which itself is normally vented and closed but is opened upon increase in pressure of the governor oil supply from zero to about 45 pounds per square inch. The oil supply pressure is transmitted from the governor 21 to the pilot valve 48 through a conduit 49. The open pilot valve 48 is connected to a connector 50 from which the low pressure air passes into the controlling chambers 51 and 52 of a first shifting valve 53 and a second shifting valve 54.

The valve 53 is normally closed but opens when the rising air pressure in the controlling chamber 51 exceeds 8 pounds per square inch, yet closes when the falling air pressure in the controlling chamber 51 drops below 9 pounds per square inch. The valve 54 is normally open but closes on rising air pressure in the controlling chamber 52 at about 8 pounds per square inch and above, whereas on falling air pressure in the controlling chamber 52 it opens at about 7 pounds per square inch or below.

The valves 53 and 54 control the shifting of the camshaft 9 by appropriately directing high pressure actuating air. A conduit 61 extends from the supply source 31 through a normally open shutoff valve 62 and through a connector 63 to a conduit 64 leading to a pressure reducing or regulating valve 66. The output from the pressure reducer 66 is at about 150 pounds per square inch and flows into a feeder pipe 67 branching to the valves 53 and 54. Also extending from the pressure reducer 66 is a line 68 supplying a control valve 69. This is conveniently a shuttle valve having an actuating chamber 71 at one end and an opposite actuating chamber 72 at the other end. Within the valve is a valve spool 73 designed to move into either one of two extreme positions, being retained in either by a spring-pressed detent 74 unless moved by superior pressure.

Air from the line 67 flowing to the valve 54, which is normally open, continues through a pipe 76 to the chamber 71 and urges the valve spool 73 to the left in the figure. In this position air from the line 68 flows through the valve spool into an operating line 77 connected to one end of a shifting cylinder 78. Within the shifting cylinder there is a piston 79 connected to a shifter 81 joined to the camshaft 9 and effective to move the camshaft axially or lengthwise. In the position shown with the parts in stopped or low speed condition, there is air pressure in the cylinder 78 urging the piston 79 and the camshaft 9 to the left, so that the cams 11 and 13 are effective upon the valves 12 and 14 with the cams 16 and 17 inoperative. The contour of the cams 11 and 13 is such as to produce engine events for low speed or light load as indicated in FIG. 2. It will be noted particularly that the intake valve is fully opened at approximately 24° before top dead center and that the exhaust valve starts to close at 34° after top dead center, so that there is a fully effective overlap of 58°. Other events of the cycle are as indicated in FIG. 2. These are appropriate valve events for starting, low speed and low load operation.

Particularly in accordance with the invention, control is likewise exerted over the fuel injection as to time and duration. Conveniently, the camshaft 9 is driven by a helical gear 8 in mesh with a helical driving gear 7 on the crankshaft. Since the camshaft 9 shifts axially, the gear 8 likewise shifts axially along the length of the extended drive gear 7. The axial shift is consequently accompanied by a polar or phase shift. In the position shown in FIG. 1 the angular or phase relationship of the camshaft is such that the fuel pump 18 begins its injection shortly before top dead center. This injection timing is partly dependent upon the phase or degree of rotation of the pump shaft 19, but in addition a further control is afforded. The pump rack 82 is operated by a rod 83 moved by a lever 85 on the governor shaft 43. For starting, the fuel rack 82 is in an extreme right-hand position, the rack shift and the shaft shift together controlling the time and duration of injection as illustrated in FIG. 2.

When the engine increases its speed or when the load increases, the governor 21 responds and the shaft 43 rotates the cam 44 accordingly to vary or increase the pressure in the regulator 46 to a value approaching 15 pounds per square inch. This increased pressure as it rises above 8 pounds per square inch in the chamber 52 tends to shut down the valve 54, to stop the flow of air into the conduit 76 and to vent that conduit so that the chamber 71 is exhausted. The valve spool 73, however, does not yet shift because it is held by the detent 74. However, the rising air pressure is also effective in the control chamber 51 for the valve 53. As it passes 8 pounds per square inch in rising, the pressure opens the valve 53 and is increased in a line 84 connected to the chamber 72. The pressure rise is sufficient to cause a translation to the right of the valve spool 73. In the new position, the spool 73 vents the line 77 and supplies air under pressure from the line 68 to a line 86 going to the other end of the shifting cylinder 78.

The increase in pressure on the left side of the piston 79, the right side having been exhausted, through the shifter 81 moves the camshaft 9 axially into the dotted line position of FIG. 1. As the axial translation occurs, the camshaft is likewise rotated with respect to the crankshaft. The axial translation of the camshaft moves the cams 11 and 13 out of position with respect to the valves 12 and 14 and moves the cams 16 and 17 into effective position. The rotation of the camshaft as it is translated similarly rotates the fuel pump drive shaft 19 to change the timing of the fuel injection. All of the conditions are then appropriate for operation of the engine either under a heavy load or at full speed or a combination of both.

The cams 16 and 17 are contoured to produce engine events substantially as shown in FIG. 3. It will be noted therein that the intake valve is fully open at 48° before top dead center, as distinguished from 24° before top dead center at light load operation, and that the exhaust valve opens at 40° before bottom dead center, as distinguished from 16° before bottom dead center at starting and under light load. The exhaust closing and the intake closing are likewise at different points as shown in FIGS. 2 and 3. Further than that, the fuel pump time of injection and the duration of fuel injection are varied as indicated in FIGS. 2 and 3. Thus as the speed or load on the engine increase, the camshaft shifts from one condition of low speed, low load and starting operation and into another condition for high speed, high load operation. In the high speed, high load operation the events are such as to give the maximum effective performance from the engine, whereas at the low speed or starting condition the cycle events are such as to obviate the difficulties initially recounted above.

It is desirable to make changes in the engine operating conditions other than those associated with the valve timing and the injection timing. We therefore provide means for varying the pressure of the intake air. From the line 77 a pipe 91 extends through a choke 92 to one end of a cylinder 93, while a line 94 extends from the line 86 through another choke 96 to the other end of the cylinder 93. A piston 97 within the cylinder 93 is connected by the appropriate linkage to a butterfly throttle valve 98 in the engine air intake duct 23. Under high speed or heavy load operation the butterfly 98 should be fully open to afford appropriate effect from the exhaust turbine supercharger (not shown). Under light load or low speed operation the air pressure within the duct 23 should be substantially less.

In starting, when there is air within the pipe 77 there is likewise air under pressure in the pipe 91 which moves the piston 97 into the position shown in FIG. 1 and thus moves the butterfly 98 toward nearly closed position. Air in the duct 23 from the supercharger is promptly reduced in pressure so that in the heat exchanger 24 or the manifold 26 the intake air pressure instead of being superatmospheric is subatmospheric, ranging between 4 inches of mercury column to 6 inches of mercury column. When the engine load or speed increase above a predetermined value and pressure is relieved from the pipe 77 to become available in the pipe 86, pressure is then transmitted through the pipe 94 and the choke 96 to the lower end of the cylinder 93. The piston 97 is thrust upwardly and moves the butterfly 98 into its horizontal, nonobstructing position so that supercharger pressure is made available through the heat exchanger 24 to the manifold 26. In this fashion the inlet manifold pressure is varied between a superatmospheric value when the engine is working heavily or fast and a subatmospheric value when the engine is working lightly or slowly.

There is preferably a further control which is similarly exercised. This has to do with inlet air temperature. Branching from the pipe 91 is a duct 101 extending to a water valve 102 connected to the heat exchanger 24. Another conduit 103 extends from the line 94 through a unidirectional throttling mechanism 104 to a valve 106 also connected to the heat exchanger 24. The valve 102 can be positioned to supply raw cold water to the heat exchanger 24, and the valve 106 can be similarly positioned to return water from the heat exchanger 24 to the raw water supply or to waste. In another position the valve 102 is connected through a pipe 107 to the jacket water or cooling water of the engine itself. While this is cold when the engine is being started, unless a separate heater is supplied, it normally is relatively warm or hot water. Similarly, the valve 106 when comparably positioned returns the discharge from the heat exchanger 24 back to the engine water jacket through a conduit 108.

There is an additional control of the valve 102 in that a thermal actuator 109 in the jacket water governs a flow valve 110 in the control duct 101. When the jacket water temperature is relatively low, the thermometer 109 keeps the valve 110 closed. In turn, this keeps a valve 111 in the jacket water supply pipe 107 in closed position. There can then be no circulation of cold water from the engine jacket to the heat exchanger 24 when the engine is first started. When the jacket water has attained an appropriate temperature, the actuator 109 opens the valve 110, which in turn causes opening of the valve 111. Jacket water then flows from the pipe 107 through the valve 102 into the heat exchanger 24 and from thence through the valve 106 to the pipe 108 and back to the engine jacket.

As the engine is started, there is at first no circulation of water in any fashion whatsoever to the heat exchanger 24, but as soon as the engine has warmed sufficiently and jacket water can be circulated, then at low load or low speed warm water is supplied to the heat exchanger 24. The incoming air in passing from the duct 23 into the manifold 26 is appropriately warmed. This improves combustion and is an effective technique. On the other hand, after the engine has been brought up to a medium to high speed or after the load has substantially increased, the pressure in the line 101 is dropped and this turns the valve 102 from its jacket water position to its raw water position. Almost simultaneously, increase in pressure in the line 103 moves the discharge valve 106 from its jacket water position to its raw water position. Raw water is cool, and thus the ingoing air to the engine is cooled in the exchanger 24. This is advisable for supplying the loaded engine with air at maximum density for improved combustion and load-carrying characteristics. The delay mechanism 104 has the effect of slowing the switching of the water supply to the heat exchanger sufficiently so that the jacket water, which may contain additives, is not contaminated by raw water.

With this arrangement as so far described, there is afforded an automatic and effective mechanism for operating the engine under two different conditions but with optimum parameters for each of the conditions. Further, since the changeover from one condition to the other in an ascending direction takes place at different values of pressure than when the parameters are descending, the engine control does not hunt but rather is stable under all operating conditions despite wide variations in load and quick changes in speed.

Under some circumstances the system for the heat exchanger is elaborated by providing not a single heat exchanger 24 as shown in FIG. 1, but rather by providing a separate intercooler 112 and a separate heater 113. In this instance the air inlet tube 23 is as before, as is the manifold 26.

Also, the control pipe 101 is precisely as before, as is the control pipe 103. The thermometer 109 similarly controls a valve 110. There is a change, however, in that the pipe 101 branches into two ducts 114 and 115 which respectively control valves 116 and 117. The valve 117 is designed to receive raw water through an inlet duct 118 and to transmit the raw water either through a duct 119 to the intercooler 112 or through a cross conduit 120 to the valve 116. In one position of the valve 116 the raw water is discharged from the conduit 120 through a pipe 121 to its source or to waste. In the other position of the valve 116, raw water from the intercooler 112 is received through a short pipe 122 and is sent back to the duct 121. The control pressure in the pipe 101 controls the flow of raw water either through the cooler 112 or shunting the cooler. The air flowing through the cooler 112 is either left unchanged as to temperature or is reduced in temperature.

The control duct 103, when the valve 110 is open, is effective to transmit control pressure to branch pipes 123 and 124 leading respectively to control valves 126 and 127. The valve 127 in one position transfers warm jacket water from a pipe 128 into a short pipe 129 leading to the heater 113, or in its other position transfers the warm jacket water from the pipe 128 through a connecting pipe 131 joined to the valve 126. From there the shunted water is discharged through a pipe 132 leading back to the engine jacket. When the valve 127 passes the jacket water to the pipe 129 and the heater 113, then the valve 126 is in position to receive warm water from the heater 113 through a short pipe 133 and deliver it to the pipe 132 for return to the jacket. The heater 113 is thus designed and arranged to operate during low speed and low load operation of the engine, but as the engine speed increases and load increases, the heater 113 is cut out of operation completely and the intercooler 112 is put into operation. In this fashion the temperature of the air supplied to the engine is always appropriate to the engine operating conditions, as before, but it is not necessary to intermix any of the raw water which is utilized in the intercooler 112 with the jacket water which is utilized in the heater 113. Water mixing and loss of additives is prevented and the use of a delay switch such as 104, as shown in FIG. 1, is obviated.

Figure 5:
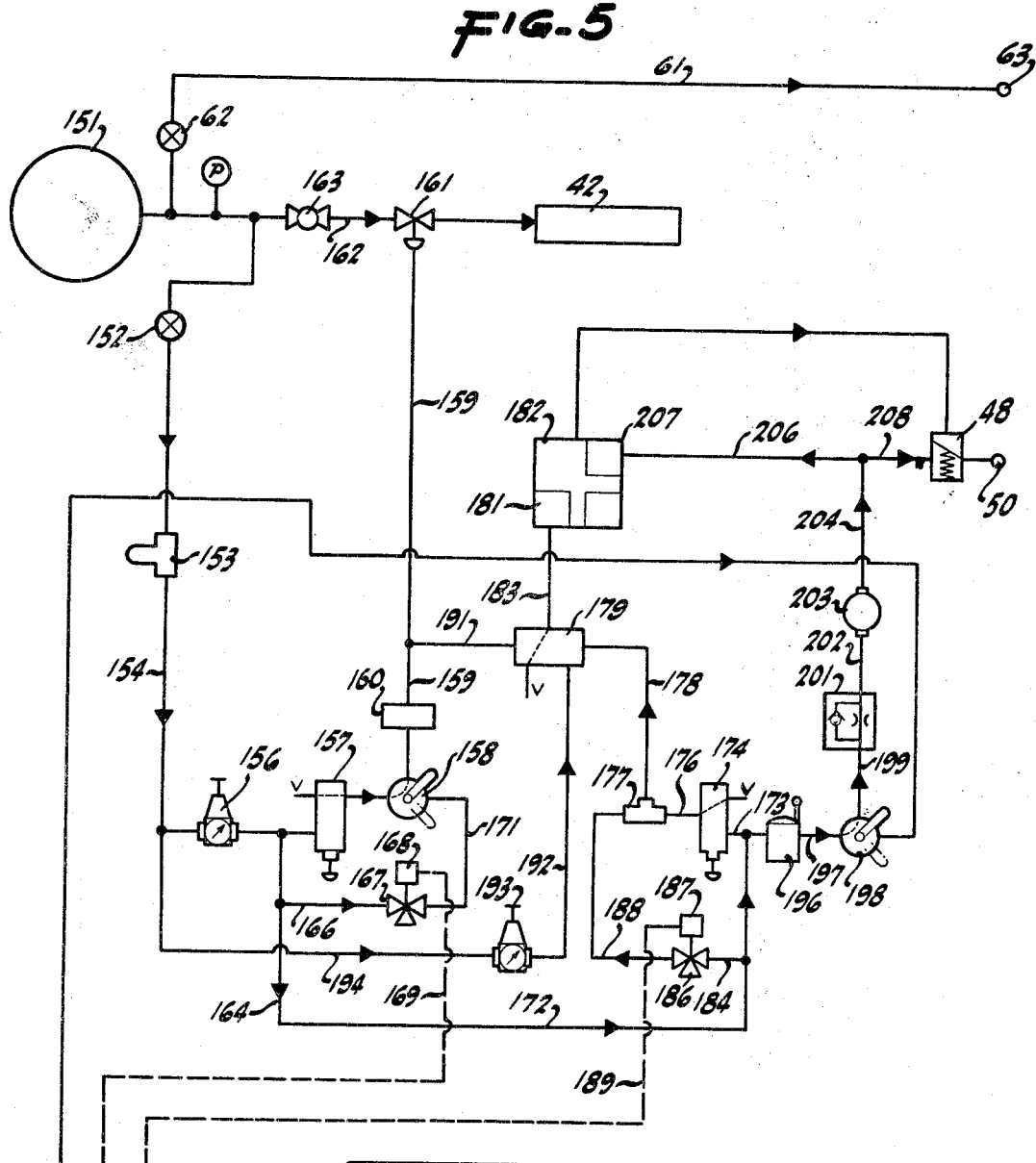
FIG. 5 is a diagram showing a different form of part of a controller arrangement to be utilized with some of the structure disclosed in FIG. 1.
Figure 4:
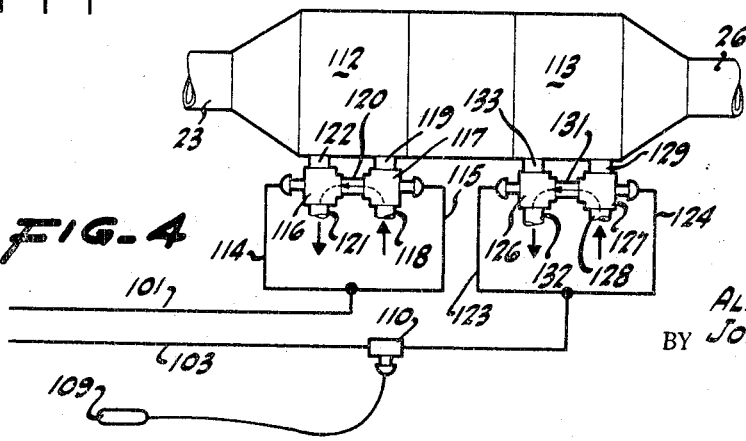
FIG. 4 is a detail diagram showing a modified form of heat exchanger arrangement for the intake air.

In some installations the general layout previously illustrated and described is useful, but additional controls are needed because of the environment of the installation, particularly on shipboard or in other areas where a remote control may be desired. As shown in FIG. 5, a modified arrangement is designed to be attached at the connectors 50 and 63 to substitute for the structure illustrated in FIG. 1 to the left of the connectors. The mechanism to the right, in the figures, of the connectors 50 and 63 is standard and remains. The variation in FIG. 5, therefore, is of the preliminary control structure leading to the connectors 50 and 63.

In this arrangement there is an air supply 151, as before, at approximately 250 pounds per square inch. This air is made available through a control valve 152 and a strainer 153 to a line 154 leading to a pressure regulating valve 156 which drops the pressure to from 80 to 100 pounds. Output from the pressure regulator 156 extends to a manually operated pull valve 157 utilized for starting. The pull valve is normally in a vented position but when manually actuated supplies air at about 80 to 100 pounds per square inch pressure to a selector valve 158 which has two positions. In one position the selector valve permits a local start of the engine, whereas in its other position the selector valve permits a remote start of the engine. In the local position as shown, incoming air to the selector valve 158 travels through a conduit 159 having a barring device interlock 160 to a control valve 161. High pressure air from the source 151 flows through a conduit 162 and downstream of a shutoff valve 163 to supply high pressure air to the engine starting manifold 42, as before.

In the event the selector valve 158 is in the remote start position, the pull valve 157 is ineffective, but a conduit 164 connected to the downstream side of the pressure regulator 156 has a pipe 166 leading to a control valve 167 operated by a solenoid 168 joined by an electrical lead 169 to a remote point (not shown) for operation. Energization of the solenoid 168 produces the same effect as operating the manual valve 157 and passes air from the pipe 166 into a line 171 joined through the properly oriented selector valve 158 to the line 159, thus supplying the starting manifold with starting air by remote control.

There is a conduit 172 joined to the pipe 164 and which goes to a branch line 173. In the left branch of the line 173 there is a manually actuated pull stop valve 174 which normally is vented but when pulled to stop the engine transmits air under from 80 to 100 pounds per square inch pressure from the line 173 through the valve 174 into a line 176 extending through a double check valve 177 to a pipe 178 controlling the operation of a valve 179. When pressure from the line 178 is put on the valve 179, the valve is effective to vent a stop device 181 in the governor 182. Venting is to the atmosphere through a line 183 joined to the valve 179. Pulling the valve 174 causes the governor 182 and the stop device 181 to stop the engine. This also can be done by remote control. The line 172 has a branch 184 going to a control valve 186 governed by an electrical solenoid 187 and having a vent outlet and a pressure connection pipe 188 extending to the check valve 177.

When the solenoid 187 is energized through an electrical line 189 from a remote point (not shown), the valve 186 is opened and pressure extends through the line 188 in the governor 182 and shutting down the engine from the remote point. For normal operation, of course, upon starting of the engine, whenever there is pressure of about 80 to 100 pounds per square inch in the line 159, that pressure is transmitted through a branch 191 to the left end of the control valve 179 and shifts the spool of the valve from its vent position as shown into a position connecting the line 183 with the low pressure line 192 on the downstream side of a pressure regulator 193 supplied from a line 194 connected to the pipe 154. Preferably the pressure regulator 193 maintains a pressure in the line 192 of about 75 pounds per square inch, enough to actuate the stop device 181.

There is an additional control of the engine in this particular arrangement. The branch conduit 173 on the right side extends to a manually operable speed control valve 196 connected by a duct 197 to a position controller 198. This is shown in the local control position and has in addition, as shown in dotted lines, a remote control position. In the indicated local control position, when the speed control valve 196 is actuated, the result is to vary the pressure in the pipe 197 and also in a pipe 199 extending through a one-way restriction device 201 into a line 202 connected to an accumulator 203. The outlet from the accumulator is through a pipe 204 into a branched line, one branch 206 of which extends to a speed device 207 in the governor 182. In this way the speed of the engine can be manually controlled by the valve 196.

The effect of the restrictor 201 is to permit only a gradual increase in air pressure in the conduit 202, the rate of increase likewise being affected by the capacity of the accumulator 203. As the outlet pressure from the accumulator varies from 3 to 15 pounds per square inch in accordance with engine speed, the restriction and accumulator capacity involve a delay of approximately 20 seconds (in one installation) from a relatively slow engine speed to a relatively fast engine speed. This is for the purpose of preventing excessive acceleration.

On the other hand, when the engine is being slowed by retracting the controller of the valve 196, return flow is freely effected through the check valve side of the restrictor 201, which permits quick dropping of the pressure within the line 202, the accumulator 203, the line 204 and the branch 206.

The pressure in the line 204 is transmitted through a line 208 to the connector 50 so as to be effective in the line extending to the valves 53 and 54 as previously indicated. The pilot valve 48 is disposed in the branch 208 of the line 204, the pilot valve being supplied with governor oil under pressure through the line 49 from the governor 182 exactly as before. Thus when the governor oil pressure is relatively low, as in starting the engine, the valve 48 is closed and there is no pressure at the connector 50. However, when the engine speed increases sufficiently so that the governor oil pressure is approximately 45 pounds per square inch, then the valve 48 is opened and whatever pressure exists then within the line 208 is made available at the connector 50, as before.

At all times pressure from the source 151 at approximately 250 pounds per square inch is supplied through the shutoff valve 62 and the line 61 to the connector 63 for use downstream in the system.

The arrangement shown in FIG. 5 to the left of the connectors 50 and 63 can readily be substituted for the arrangement of FIG. 1 to the left of the connectors 50 and 63. In this fashion there is afforded both a local and a remote control for the engine, and there is likewise afforded a manual speed variation by reason of the valve 196, and there is further provided a manual stop mechanism for shutting the engine down.

With all of the arrangements described, there is provided an improved controller for an engine. The operator has available to him an improved controller so that he can at his option set the operating mechanisms of the engine in either of two ways, one especially adapted for proper operation of the engine in starting and in running at low speed or low loads, and the other well adapted for proper and satisfactory operation at high speeds or high loads or both.

We claim:

1. An engine controller for a poppet valve internal combustion engine having a fuel injection pump shiftable between a relatively late injection position and a relatively early injection position, having a governor, having a valve camshaft endwise shiftable between a first position and a second position and having an inlet air throttle movable between open position and closed position, said controller comprising means responsive to said governor at one engine operating condition for shifting said fuel injection pump into said relatively late injection position, shifting said valve camshaft into said first position having relatively small valve timing overlap and moving said inlet air throttle toward closed position, and said controller comprising means responsive to said governor at another engine operating condition for shifting said fuel injection pump into said relatively early ignition position, shifting said valve camshaft into said second position having relatively large valve timing overlap and moving said inlet air throttle toward open position.

2. An engine controller as in claim 1 in which said camshaft is shifted axially to bring different sets of cams into operating position and is driven by helical gears having parallel axes, and said fuel injection pump for said engine has an axially fixed driving shaft driven by said camshaft.